US012116247B2

(12) United States Patent
Kundel, Sr.

(10) Patent No.: US 12,116,247 B2
(45) Date of Patent: Oct. 15, 2024

(54) OPEN COLUMN JIB CRANE

(71) Applicant: Kundel Industries, Inc., Vienna, OH (US)

(72) Inventor: Robert Kundel, Sr., Corland, OH (US)

(73) Assignee: Kundel Industries, Inc., Vienna, OH (US)

( * ) Notice: Subject to any disclaimer, the term of this patent is extended or adjusted under 35 U.S.C. 154(b) by 107 days.

(21) Appl. No.: 17/740,435

(22) Filed: May 10, 2022

(65) Prior Publication Data

US 2023/0365382 A1 Nov. 16, 2023

(51) Int. Cl.
*B66C 23/02* (2006.01)

(52) U.S. Cl.
CPC .................................. *B66C 23/022* (2013.01)

(58) Field of Classification Search
CPC .................. B66C 23/022; B66C 23/00; B66C 23/02–027; B66C 23/04; B66C 23/025
See application file for complete search history.

(56) References Cited

U.S. PATENT DOCUMENTS 2,825,471 A * 3/1958 Bushman ................ B66C 23/84 212/253
2008/0245522 A1* 10/2008 Hamilton ................ B66C 23/16 166/77.51
2020/0325006 A1* 10/2020 Kundel, Sr. ............. B66C 23/16

FOREIGN PATENT DOCUMENTS

CN 111977523 A * 11/2020

* cited by examiner

*Primary Examiner* — Sang K Kim
*Assistant Examiner* — Nathaniel L Adams
(74) *Attorney, Agent, or Firm* — Sand, Sebolt & Wernow Co., LPA

(57) ABSTRACT

A jib crane that includes an open column having a first end and a second end opposite to the first end that is adapted to operably engage with a ground surface. The jib crane also includes at least one interior space collectively defined by the open column between the first end and the second end. The jib crane also includes a crane beam operably engaged with the open column at the second end of the open column. The jib crane also includes a bearing assembly operably engaged with the crane beam and the open column, and the bearing assembly has at least one bearing positioned inside of the at least one interior space defined by the open column.

23 Claims, 9 Drawing Sheets

OPEN COLUMN JIB CRANE

TECHNICAL FIELD

The present disclosure is generally directed to cranes. More particularly, the present disclosure is directed to jib cranes and systems. Specifically, the present disclosure is directed to a jib crane having an open column with a bearing assembly provided inside of the open column.

BACKGROUND

Jib cranes and similar cranes are used in various industries for supporting, raising, and lowering equipment or objects. Generally, these jib cranes are used in various work areas for repetitive and unique lifting tasks based on the industry. Moreover, various types of jib cranes exist in the crane market to meet various types of needs and systems for different operations. Examples of jib cranes provided in the market include, but not limited to, freestanding jib cranes, foundationless jib cranes, mast type jib cranes, wall mounted jib cranes, articulating jib cranes, and other suitable jib cranes of the like. While numerous jib cranes have been available, each and every jib crane provides basic, overhead lifting characteristics for maneuvering equipment and objects at various locations desired by the operators of these jib cranes.

Generally, however, freestanding and foundationless jib cranes must be configured to rotate about their mast and/or column for rotatably moving objects and/or equipment about itself. To combat these issues, conventional freestanding and foundationless jib cranes use bearings and other similar assemblies for rotatably moving objects and/or equipment about itself. While these bearings are basic assemblies, these bearing assemblies may incur high amount of stress during repetitive use of continually rotating objects of varying weights; as such, the balls and/or cylinders provided in these bearings for freestanding and foundationless jib cranes may degrade and wear at an increase rate depending on the use and function of these bearing. As such, replacing these bearings on freestanding and foundationless jib cranes may become problematic to operators and owners of these cranes. Generally, replacing these bearings on these types of jib cranes may lead to down time and/or loss of operation of these cranes due to the extent of removing and/or disconnecting assemblies and parts from these cranes. As such, replacement of basic parts, such as bearings, may incur loss of operation time and loss of profits for an operator when these jib cranes are being serviced.

SUMMARY

The presently disclosed jib crane provides operators with the multifunctional use for lifting objects and rotating said lifted objects about the jib crane. The disclosed jib crane includes an open column configuration with a bearing assembly positioned inside of the open column for ease of access and repair. The disclosed davit crane is configured to enable a crane beam of the davit crane to be rotatably moveable about the open column via the bearing assembly. The disclosed davit crane is also configured to enable the crane beam of the davit crane to be longitudinally moveable along a trolley assembly relative to the open column in aft and fore directions. As such, the jib crane disclosed herein addresses some of the inadequacies of previously known jib cranes and other similar types of cranes.

In one aspect, an exemplary embodiment of the present disclosure may provide a jib crane. The jib crane includes an open column that has a first end and a second end opposite to the first end that is adapted to operably engage with a ground surface. The jib crane also includes at least one interior space collectively defined by the open column between the first end and the second end. The jib crane also includes a crane beam operably engaged with the open column at the second end of the open column. The jib crane also includes a bearing assembly operably engaged with the crane beam and the open column, the bearing assembly has at least one bearing positioned inside of the at least one interior space defined by the open column.

This exemplary embodiment or another exemplary embodiment may further provide that the crane beam is rotatably moveable about the open column via the bearing assembly. This exemplary embodiment or another exemplary embodiment may further provide that the crane beam is longitudinally moveable in aft and fore directions relative to the open column. This exemplary embodiment or another exemplary embodiment may further provide that the bearing assembly further comprises a tube having a first end operably engaged with the crane beam and a second end opposite to the first end; and a mounting plate operably engaged with the first end of the tube; wherein the at least one bearing operably engages with the tube between the first end of the tube and the second end of the tube and operably engaged with the open column. This exemplary embodiment or another exemplary embodiment may further provide at least one support plate operably engaging the open column at the first end of the open column. This exemplary embodiment or another exemplary embodiment may further provide that the at least one support plate comprises: a top surface; a bottom surface opposite to the top surface; and a through-hole defined by the at least one support plate extending from the top surface to the bottom surface; wherein the through-hole is configured to receive the at least one bearing in which the at least one support plate and the at least one bearing operably engaged with one another. This exemplary embodiment or another exemplary embodiment may further provide that the bearing assembly further comprises: a second bearing operably engaged with the tube between the first end of the tube and the second end of the tube and operably engaged with the open column; wherein the second bearing opposes the at least one bearing on the tube; and wherein the second bearing is positioned inside of the at least one interior space defined by the open column. This exemplary embodiment or another exemplary embodiment may further provide a second support plate operably engaging the open column at a position between the first end of the open column and the second end of the open column; wherein the second support plate is vertically below the at least one support plate on the open column. This exemplary embodiment or another exemplary embodiment may further provide that the second support plate comprises: a top surface; a bottom surface opposite to the top surface; and a through-hole defined by the at least another support plate extending from the top surface to the bottom surface; wherein the through-hole is configured to receive the second bearing in which the second support plate and the second bearing operably engaged with one another. This exemplary embodiment or another exemplary embodiment may further provide a trolley assembly operably engaged with crane beam and the bearing assembly; wherein the crane beam is configured to be longitudinally moveable along the trolley assembly in aft and fore directions relative to the open column. This exemplary embodiment or another exemplary embodiment may further provide that the trolley assembly comprises: a trolley frame operably engaged with the mounting plate of the bearing assembly; and at least one roller assembly operably engaged with the support plate and the crane beam; wherein the at least one roller assembly is configured to enable longitudinally movement of the crane beam in the aft and fore directions relative to the open column. This exemplary embodiment or another exemplary embodiment may further provide that the crane beam further comprises: a first strut; a second strut operably engaged with the first strut; and a channel collectively defined between the first strut and the second strut; wherein the trolley assembly is operably engaged with the crane beam between the first strut and the second strut inside the channel. This exemplary embodiment or another exemplary embodiment may further provide that the crane beam further comprises: a first end; a second end opposite to the first end of the crane beam; and at least one rail extending between the first end of the crane beam and the second end of the crane beam; wherein the at least one rail is configured to receive the at least one roller assembly in which the crane beam and the at least one roller assembly operably engage with one another. This exemplary embodiment or another exemplary embodiment may further provide that the trolley assembly further comprises: a second roller assembly operably engaged with the support plate and the crane beam; and wherein the crane beam further comprises: a second rail extending between the first end of the crane beam and the second end of the crane beam; wherein the second rail is configured to receive the second roller assembly in which the crane beam and the second roller assembly operably engage with one another. This exemplary embodiment or another exemplary embodiment may further provide that the second roller assembly is positioned vertically below the at least one roller assembly on the support plate. This exemplary embodiment or another exemplary embodiment may further provide that the second rail is positioned vertically below the at least one rail on the crane beam. This exemplary embodiment or another exemplary embodiment may further provide a hanger assembly operably engaged with the crane beam; wherein the hanger assembly is configured to be longitudinal moveable along the crane beam.

In another aspect, and exemplary embodiment of the present disclosure may provide a method of moving an object with a jib crane between a first position and a second position. The method comprises steps of: engaging a bearing assembly of the jib crane with an open column of the jib crane, wherein the bearing assembly includes at least one bearing positioned inside of the open column; attaching the object, via a hanger assembly, with the jib crane; and moving the object with the jib crane between the first position and the second position.

This exemplary embodiment or another exemplary embodiment may further provide a step of rotating a crane beam of the jib crane, via the bearing assembly, about open column of the jib crane. This exemplary embodiment or another exemplary embodiment may further provide a step of moving the object longitudinally, via the hanger assembly, between a first end of the crane beam and the second end of the crane beam. This exemplary embodiment or another exemplary embodiment may further provide a step of moving the crane beam longitudinally, via a trolley assembly, in aft and fore directions relative to the open column.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

FIGS. 1-6 illustrate an open column jib crane (hereinafter "jib crane") generally referred to as 1. Such assemblies, components, and members of the jib crane 1 and operation of such assemblies, components, and members of the jib crane 1 are described in more detail below.

Figure 1:
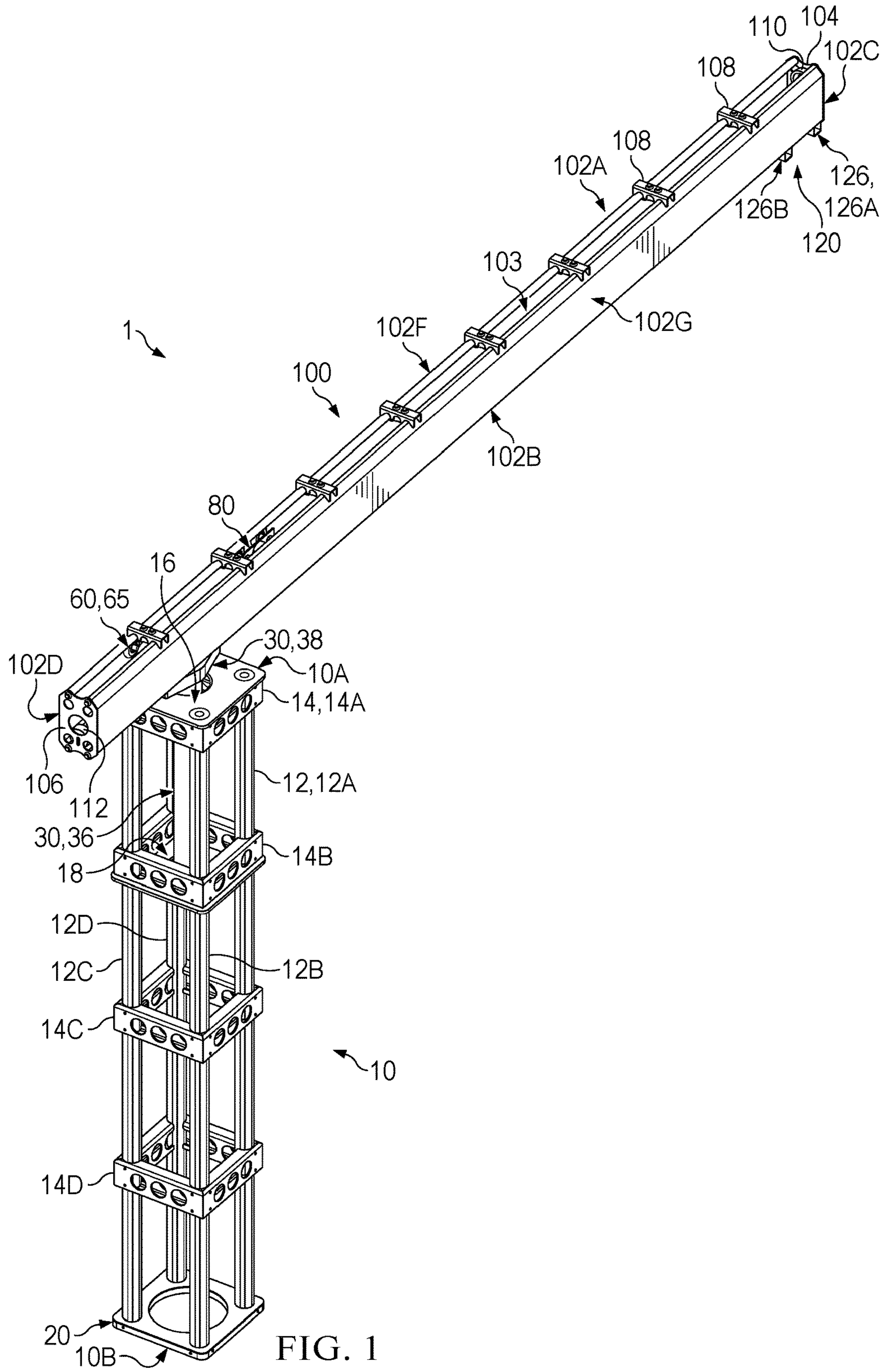
FIG. 1 is a top, rear, right side isometric perspective view of an open column jib crane in accordance with an aspect of the present disclosure.
Figure 2:
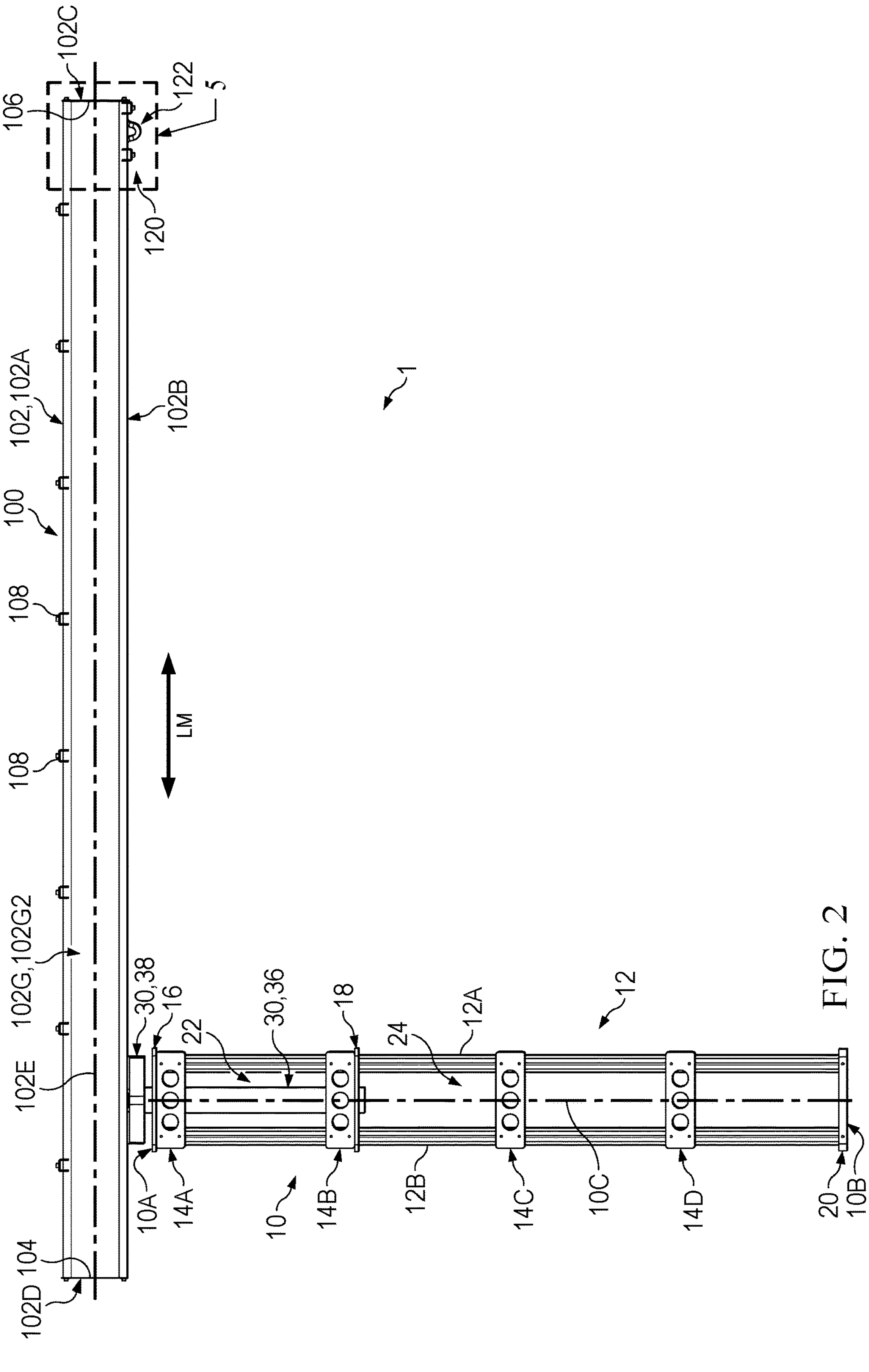
FIG. 2 is a right side elevation view of the open column jib crane in accordance with an aspect of the present disclosure.

Referring to FIGS. 1-2, the jib crane 1 includes an open column or mast 10 that operably engaged with a ground surface. The open column 10 includes a top or first end 10A, a bottom or second end 10B opposite to the top end 10A, and a longitudinal axis 10C defined therebetween. The open column 10 includes a set of support posts 12 that extend between the top end 10A and the bottom end 10B of the open column 10 along the longitudinal axis 10C of the open column 10. The set of support posts 12 also defined a square cross-sectional shape for the open column 10. In the illustrated embodiment, the set of support posts 12 includes a first support post 12A, a second support post 12B, a third support post 12C, and a fourth support posts 12D. In other exemplary embodiments, any suitable number of support posts may be provided in a set of support posts for an open column that define any suitable cross-sectional shape.

Still referring to FIGS. 1-2, the open column 10 also includes sets of braces 14 operably engaged with the set of support posts 12. The sets of braces 14 are positioned along the set of support posts 12 between the top end 10A and the bottom end 10B of the open column 10. As illustrated in FIGS. 1 and 2, a first set of braces 14A of the sets of braces 14 operably engages with each support posts of the set of support posts 12 at the top end 10A of the open column 10A. A second set of braces 14B of the sets of braces 14 operably engages with each support posts of the set of support posts 12 between the first set of braces 14A and the bottom end 10B of the open column 10. A third set of braces 14C of the sets of braces 14 operably engages with each support posts of the set of support posts 12 between the second set of braces 14B and the bottom end 10B of the open column 10. A fourth set of braces 14C of the sets of braces 14 operably engages with each support posts of the set of support posts 12 between the third set of braces 14C and the bottom end 10B of the open column 10.

As illustrated in FIGS. 1 and 2, each set of braces 14A, 14B, 14C, 14D in the sets of braces 14 has four braces where each brace operably engages with at least two support posts of the set of support posts. For example, a first brace 14A' of the first set of braces 14 operably engages with the first support post 12A and the second support post 12B. In this same example, a second brace 14A" of the first set of braces 14 operably engages with the second support post 12B and the third support post 12C. In this example, the remaining braces of the first set of braces 14 (e.g., third and fourth braces 14A'", 14A"") operably engage with the first support ports 12A, the third support post 12C, the fourth support post 12D. Each brace in the second, third, and fourth sets of braces 14B, 14C, 14D also operably engage with the set of support posts 12 substantially similar to each brace of the first set of braces 14A as described previously.

In other exemplary embodiments, any suitable number of braces may be provided in a set of braces that operably engage with a set of support posts of an open column. In other exemplary embodiments, a set of braces may operably engage with a set of support posts of an open column in any suitable configuration. In the illustrated embodiment, the sets of braces 14 are attached and/or fastened to the set of support posts 12 via attachment mechanisms (e.g., fasteners attaching the sets of braces 14 to the set of support posts 12).

Still referring to FIGS. 1-2, the open column 10 also includes at least one support plate that operably engages with the set of support posts 12 at one of the top end 10A and the bottom end 10B of the open column 10. In the illustrated embodiment, a first or top support plate 16 operably engages with the set of support posts 12 at the top end 10A of the open column 10A proximate to the first set of braces 14A. The first support plate 16 includes a top surface 16A and a bottom surface 16B that opposes the top surface 16A and faces in an opposing direction. The first support plate 16 defines a through-hole 16C that extends entirely through the first support plate 16; the top surface 16A and the bottom surface 16B are in fluid communication with one another via the through-hole 16C. Such purpose of the through-hole 16C is described in more detail below.

Still referring to FIGS. 1-2, the first support plate 16 also defines a set of apertures 16D where each aperture of the set of aperture 16D extends entirely through the first support plate 16; the top surface 16A and the bottom surface 16B are also in fluid communication with one another via each aperture of the set of aperture 16D. In the illustrated embodiment, each aperture of set of aperture 16D surrounds the through-hole 16C and/or is peripheral to the through-hole 16C. The set of apertures 16D also enables the first support plate 16 to receive and operably engaged with the set of support posts 12 at the first end 10A of the open column 10. In other exemplary embodiments, any suitable number of apertures may be defined in a support plate to match a number of support posts for an open column.

Referring to FIGS. 1 and 2, a second or intermediate support plate 18 operably engages with the set of support posts 12 at a position between the first plate 16 and the bottom end 10B of the open column 10. Similar to the first support plate 16, the second support plate 18 includes a top surface 18A and a bottom surface 18B that opposes the top surface 18A and faces in an opposing direction. The second support plate 18 defines a through-hole 18C that extends entirely through the second support plate 18; the top surface 18A and the bottom surface 18B are in fluid communication with one another via the through-hole 18C. Such purpose of the through-hole 18C is described in more detail below.

Similar to the first support plate 16, the second support plate 18 also defines a set of apertures 18D where each aperture of the set of aperture 18D extends entirely through the second support plate 18; the top surface 18A and the bottom surface 18B are also in fluid communication with one another via each aperture of the set of aperture 18D. In the illustrated embodiment, each aperture of set of aperture 18D surrounds the through-hole 18C and/or is peripheral to the through-hole 18C. The set of apertures 18D also enables the second support plate 18 to receive and operably engaged with the set of support posts 12 at a position between the first support plate 16 and the bottom end 10B of the open column 10. In other exemplary embodiments, any suitable number of apertures may be defined in a support plate to match a number of support posts for an open column.

Referring to FIGS. 1 and 2, a third or base support plate 20 operably engages with the set of support posts 12 at the bottom end 10B of the open column 10. Similar to the first support plate 16, the third support plate 20 includes a top surface 20A and a bottom surface 20B that opposes the top surface 20A and faces in an opposing direction. The third support plate 20 defines a through-hole 20C that extends entirely through the third support plate 20; the top surface 20A and the bottom surface 20B are in fluid communication with one another via the through-hole 20C. Such purpose of the through-hole 20C is described in more detail below.

Similar to the first support plate 16, the third support plate 20 also defines a set of apertures 20D where each aperture of the set of aperture 20D extends entirely through the third support plate 20; the top surface 20A and the bottom surface 20B are also in fluid communication with one another via each aperture of the set of aperture 20D. In the illustrated embodiment, each aperture of set of aperture 20D surrounds the through-hole 20C and/or is peripheral to the through-hole 20C. The set of apertures 20D also enables the third support plate 20 to receive and operably engaged with the set of support posts 12 at the bottom end 10B of the open column 10. In other exemplary embodiments, any suitable number of apertures may be defined in a support plate to match a number of support posts for an open column.

Referring to FIGS. 1 and 2, the open column 10 also defines at least one interior space between the top end 10A and the bottom end 10B of the open column 10. In the illustrated embodiment, a first interior space 22 is defined interior to the set of support posts 12 between the first support plate 16 and the second support plate 18. The first interior space 22 is in communication with the exterior environment of the open column 10; in other words, the first interior space 22 may be accessible from the exterior environment of the open column 10. Such use and purpose of this first interior space 22 defined by the open column 10 is described in more detail below. Additionally, a second interior space 24 is defined interior to the set of support posts 12 between the second support plate 18 and the third support plate 20. The second interior space 24 is in communication with the exterior environment of the open column 10; in other words, the second interior space 24 may be accessible from the exterior environment of the open column 10. Such use and purpose of this second interior space 24 defined by the open column 10 is described in more detail below.

Figure 4A:
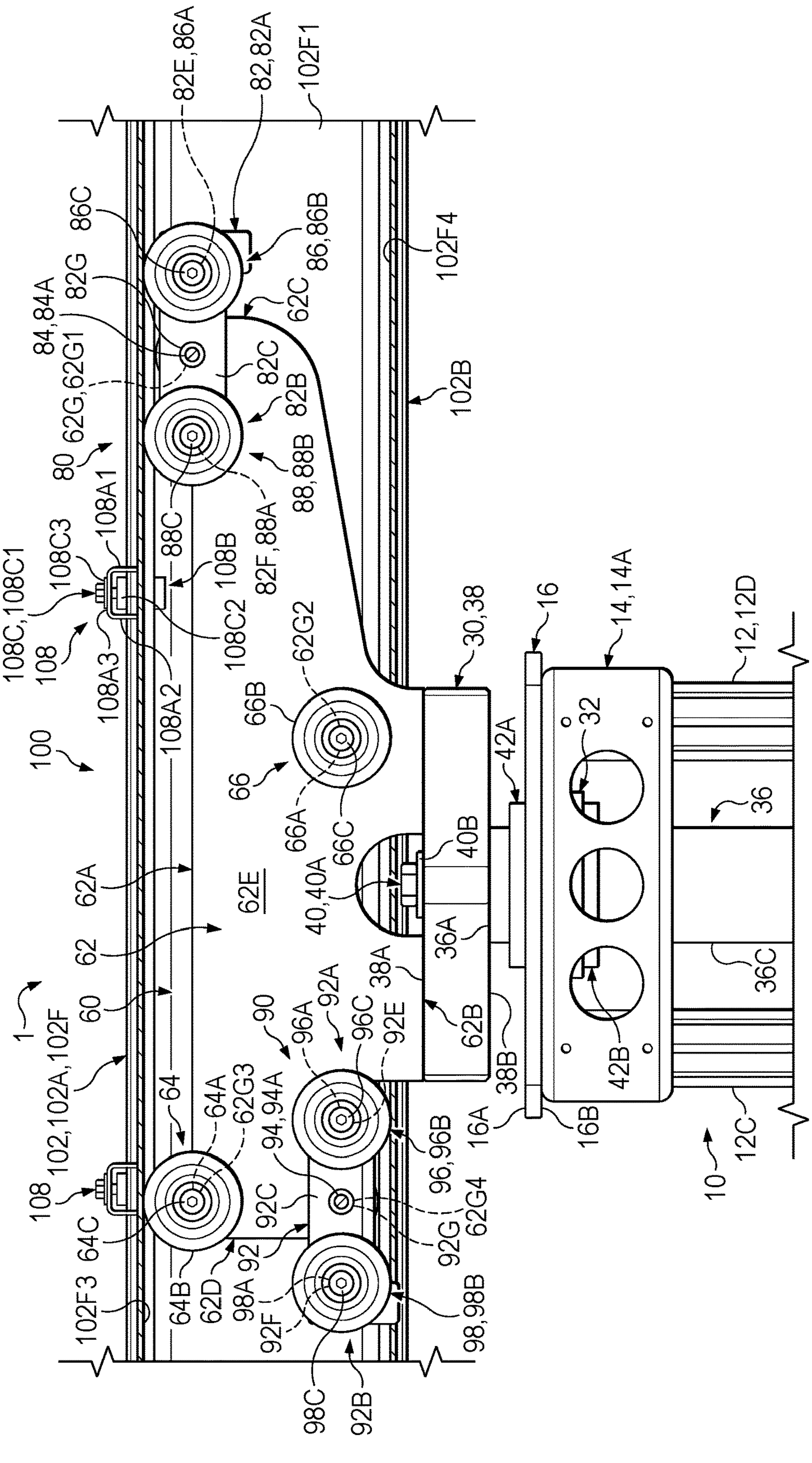
FIG. 4A is a partial sectional view of a crane beam and a trolley assembly of the open column jib crane taken in the direction of line 4A-4A in FIG. 3.
Figure 4B:
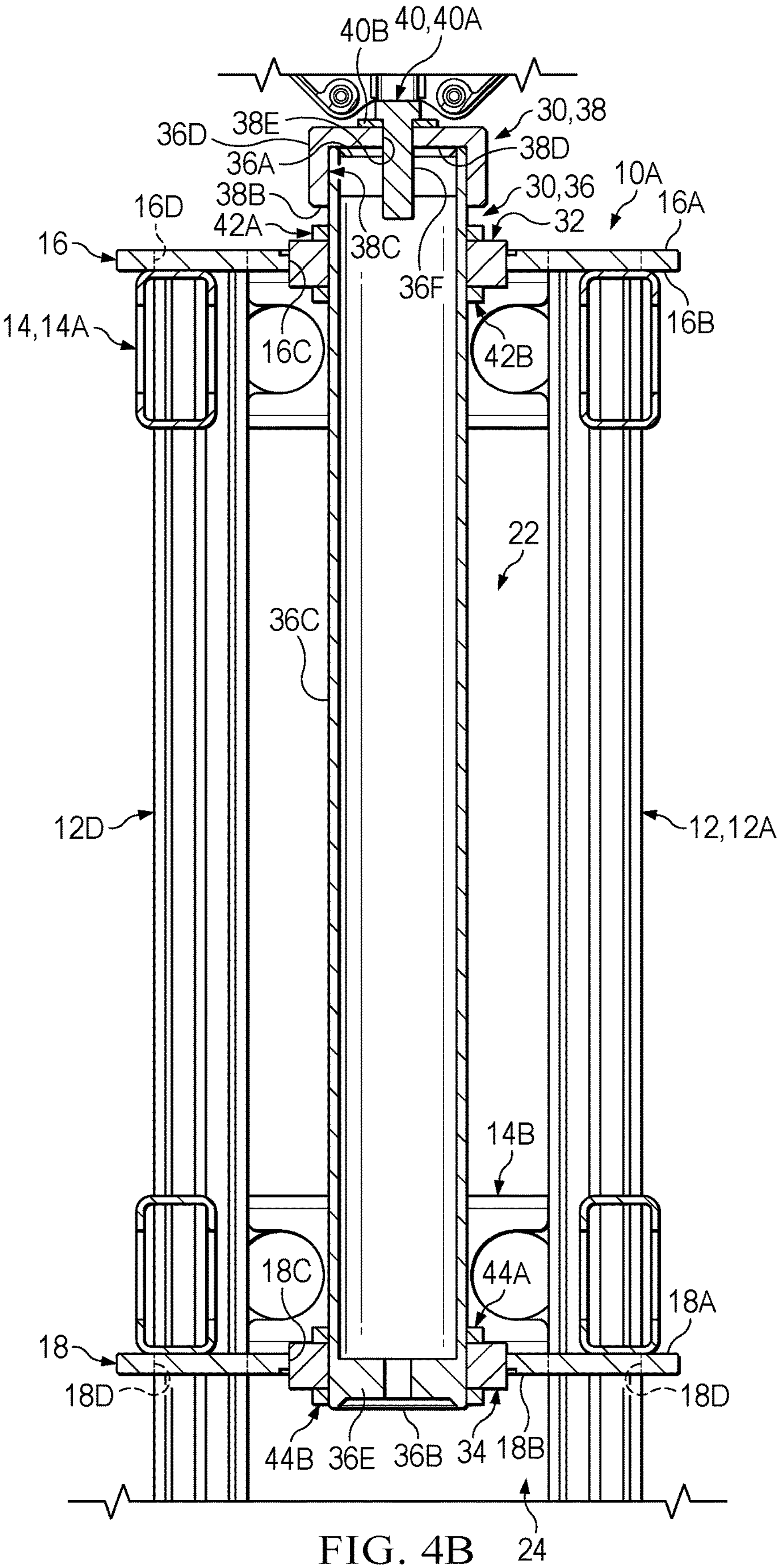
FIG. 4B is a partial sectional view of the crane beam and the trolley assembly of the open column jib crane taken in the direction of line 4B-4B in FIG. 3.
Figure 4C:
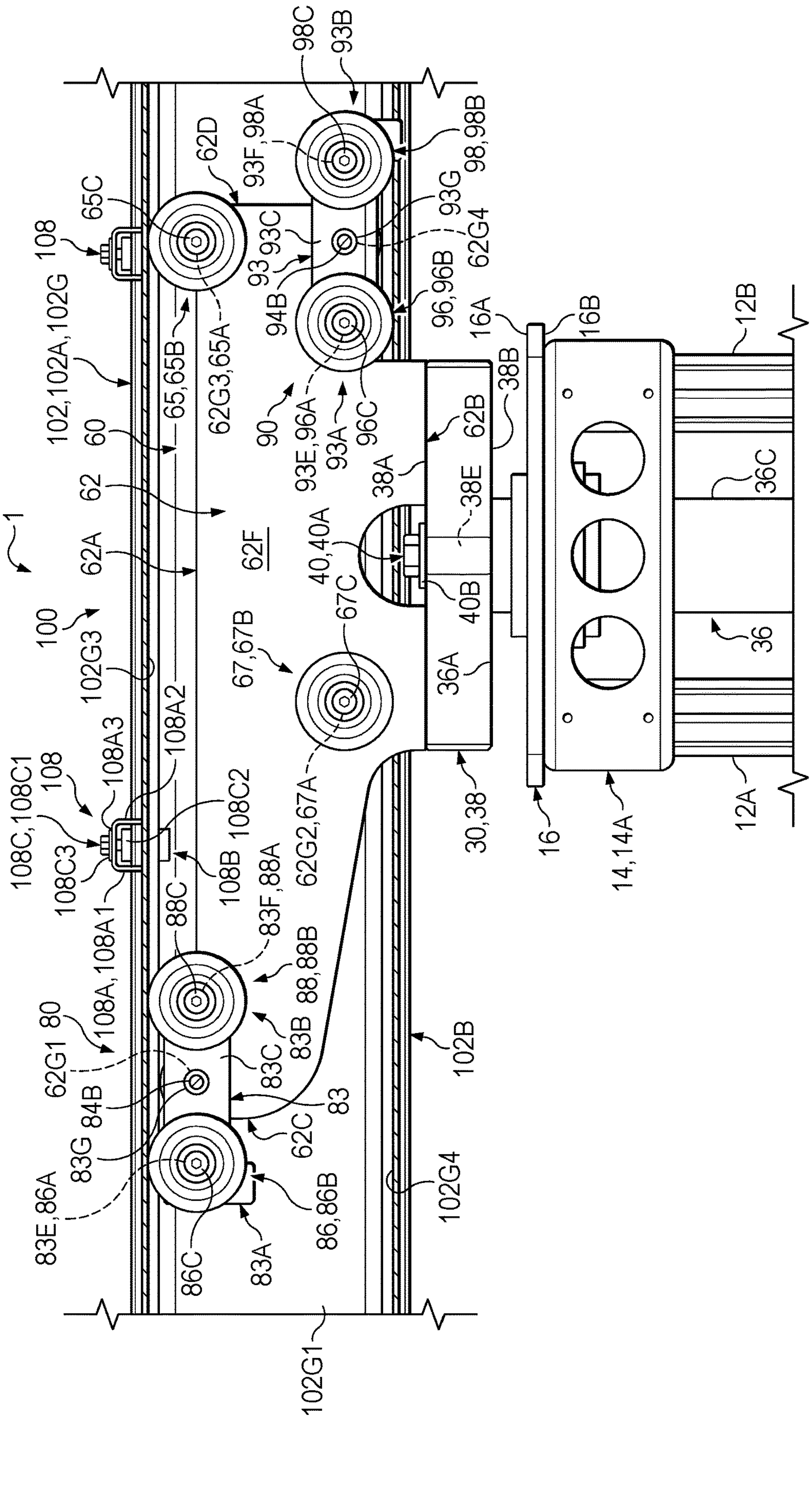
FIG. 4C is a partial sectional view of the crane beam and the trolley assembly of the open column jib crane taken in the direction of line 4C-4C in FIG. 3.
Figure 7:
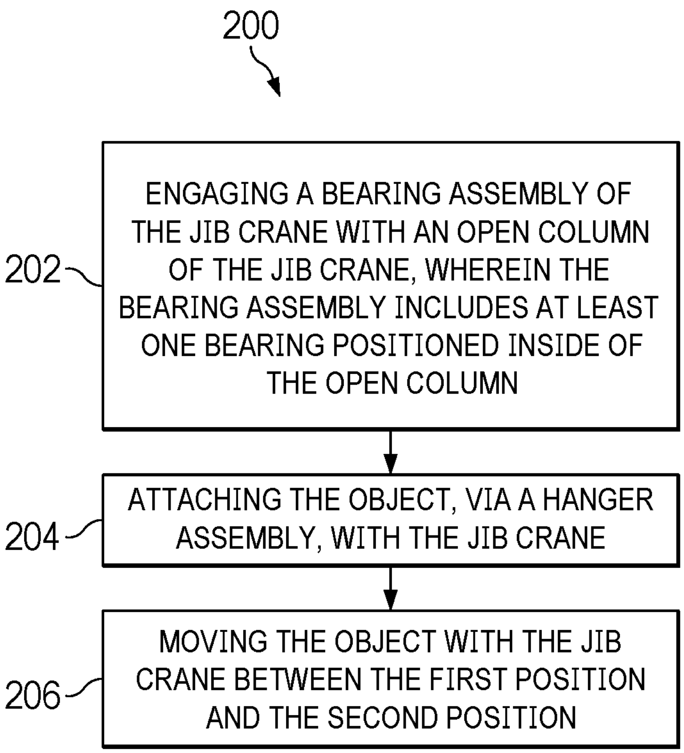
FIG. 7 is a method flow chart of moving an object with a jib crane between a first position and a second position.

Referring to FIGS. 4 and 7, the jib crane 1 includes a bearing assembly 30 operably engaged with the open column 10. The bearing assembly 30 may include at least one thrust bearing or similar bearing of the like that operably engages with one the first support plate 16 and the second support 18 of the open column 10. The at least one thrust bearing of the bearing assembly 30 is also operably engaged with one the first support plate 16 and the second support 18 of the open column 10 inside of the first interior space 22. Such positioning of the at least one thrust bearing of the bearing assembly 30 inside of the first interior space 22 enables ease of accessing the at least one thrust bearing of the bearing assembly 30 rather than bearings used in current jib cranes in the art.

In the illustrated embodiment, a first thrust bearing 22 operably engages with the first support plate 16 inside of the through-hole 16C. The first thrust bearing 16 is positioned inside of the first support plate 16 and inside of the first interior space 22 defined by the open column 10. Additionally, a second thrust bearing 24 operably engages with the second support plate 18 inside of the through-hole 18C. The second thrust bearing 18 is positioned inside of the second support plate 18 and inside of the first interior space 22 defined by the open column 10. Such use and purpose of one or both of the first thrust bearing 16 and the second thrust bearing 18 is described in more detail below.

As provided herein, any suitable thrust bearing may be used for the first thrust bearing 32 and the second thrust bearing 34. While the bearing assembly 30 uses thrust bearings, any suitable bearing may be used with the bearing assembly 30 based on various considerations, including the configuration between the bearing assembly 30 and the open column 10.

Referring to FIGS. 2, 4, and 7, the bearing assembly 30 also includes a shaft 36 that operably engages with the first thrust bearing 32 and the second thrust bearing 34. The shaft 36 includes a top or first end 36A, a bottom or second end 36B opposite to the first end 36A, and a longitudinal axis defined therebetween. The shaft 36 also includes a circumferential wall 36C that extends between the first end 36A and the second end 36B. In the illustrated embodiment, the first thrust bearing 32 operably engages with the shaft 36 about the circumferential wall 36C of the shaft 36 at a positioned between the first end 36A and the second end 36B proximate to the first end 36A. In the illustrated embodiment, the second thrust bearing 34 operably engages with the shaft 36 about the circumferential wall 36C of the shaft 36 at a positioned between the first end 36A and the second end 36B proximate to the second end 36AB. As illustrated, the first thrust bearing 32 and the second thrust bearing 34 oppose one another on the shaft 36. Such use and purpose of the shaft 36 with the first thrust bearing 32 and the second thrust bearing 34 is described in more detail below.

As illustrated in FIG. 7, the shaft 36 includes a first or top endcap 36D that is positioned at the first end 36A of the shaft 36. The first endcap 36D operably engages with the circumferential wall 36C of the shaft 36 where the first endcap 36D is disposed inside of the shaft 36. The shaft 36 also includes a second or bottom endcap 36E that is positioned at the second end 36B of the shaft 36 opposite to the first endcap 36D. The second endcap 36D operably engages with the circumferential wall 36C of the shaft 36 where the second endcap 36D is also disposed inside of the shaft 36. The first endcap 36D defines a threaded passageway 36F that extends entirely through the first endcap 36D; such use and purpose of the first endcap 36D with the threaded passageway 36F is described in more detail below.

Referring to FIG. 4, the bearing assembly 30 also includes a mounting plate 38 operably engaged with the shaft 36. The mounting plate 38 includes a first or top end 38 and a second or bottom end 38B that is opposite to the first end 38B. The mounting plate 38 also defines a first recessed opening 38C that extends from the second end 36B to an interior wall 38D. The first recessed opening 38C is sized and configured to receive a portion of the shaft 36 measured from the first end 36A to a location between the first end 36A and the second end 36B. The interior wall 38D of the mounting plate 38 also operably engages with the first end 36A of the shaft 36 when the shaft 36 and the mounting plate 38 are assembled with one another. The mounting plate 38 also defines a second opening 38E that extends from the interior wall 38D to the top end 38A; such use and purpose of the second opening 38E is described in more detail below. The second opening 38E and the first recessed opening 38C are also axially aligned and/or coaxial with one another.

Still referring to FIG. 4, the mounting plate 38 also defines a set of recessed apertures 38F that extends from the second end 36B to a set of inner walls 38G. Each recessed aperture of the set of recessed apertures 38F are separate and independent from one another in that each recessed aperture of the set of recessed apertures 38F are free from any fluid communication. The mounting plate 38 also defines a set of apertures 38H that extends from the set of inner walls 38G to the first end 38A. Each aperture of the set of apertures 38H are separate and independent from one another in that each aperture of the set of apertures 38H are free from any fluid communication. Additionally, each recessed aperture of the set of recessed apertures 38F is axially aligned with and/or coaxial with a respective aperture of the set of apertures 38H.

Still referring to FIG. 4, a securement mechanism 40 operably engages the shaft 36 and the mounting plate 38 with one another. Once the shaft 36 and the mounting plate 38 are assembled, a fastener 40A of the securement mechanism 40 passes through the mounting plate 38, via the first recessed opening 38C and the second opening 38E, and threadably engages with the threaded passageway 36F of the shaft 36. Additionally, a washer or bushing 40B may be positioned between a head of the fastener 40 and the top end 38A of the mounting plate 38. Once the fastener 40A threadably engages with the shaft 36, the shaft 36 and the mounting plate 38 are fixed with one another.

Referring to FIGS. 2 and 7, the bearing assembly 30 may also include at least one pair of collars that operably engages with the shaft 36 to maintain the position of the at least one thrust bearing. In the illustrated embodiment, a first pair of collars 42 operably engage with the shaft 36 where the first pair of collars 42 surrounds the first thrust bearing 32. Specifically, a first collar 42A of the first pair of collars 42 is positioned on the shaft 36 directly above the first thrust bearing 32, and a second collar 42B of the first pair of collars 42 is positioned on the shaft 36 directly below the first thrust bearing 32. In the illustrated embodiment, a second pair of collars 44 operably engage with the shaft 36 where the second pair of collars 44 surrounds the second thrust bearing 34. Specifically, a first collar 44A of the second pair of collars 44 is positioned on the shaft 36 directly above the second thrust bearing 34, and a second collar 44B of the second pair of collars 44 is positioned on the shaft 36 directly below the second thrust bearing 34.

Referring to FIG. 4, the jib crane 1 includes a trolley assembly 60 operably engaged with the bearing assembly 30. As described in more detail below, the trolley assembly 60 rotatable about the longitudinal axis of the shaft 36 via one or both of the first thrust bearing 32 and the second thrust bearing 34.

Referring to FIG. 4, the trolley assembly 60 includes a trolley frame 62 that operably engages with a mounting plate 38 of the bearing assembly 30. The trolley frame 62 includes a first or top end 62A, a second or bottom end 62B opposite to the first end 62A, and a vertical axis defined therebetween. The trolley frame 62 also includes a front or third end 62C positioned between the first end 62A and the second end 62B, a rear or fourth end 62C opposite to the third end 62C and positioned between the first end 62A and the second end 62B, and a longitudinal axis defined therebetween. The trolley frame 62 also includes a first surface 62E that extends between the first end 62A and the second end 62B. The trolley frame 62 also includes a second surface 62F that extends between the first end 62A and the second end 62B; the second surface 62F opposes the first surface 62E in which the first surface 62E and the second surface 62F face in opposite directions.

Still referring to FIG. 4, the trolley frame 62 also defines a set of openings 62G; such use and purpose of this set of openings 62G is described in more detail below. Each opening of the set of openings 62G defined by the trolley frame 62 extends entirely through the trolley frame 62 between the first surface 62E and the second surface 62F; the first surface 62E and the second surface 62F are in fluid communication with one another via the set of openings 62G. In the illustrated embodiment, the set of openings 62G includes four openings. As illustrated, a first opening 62G1 of the set of openings 62G is defined proximate to the first end 62A and the third end 62C, a second opening 62G2 of the set of openings 62G is defined proximate to the second end 62B and between the third end 62C and the fourth end 62D, a third opening 62G3 of the set of openings 62G is defined proximate to the first end 62A and the fourth end 62D, and a fourth opening 62G4 of the set of openings 62G is defined proximate to the second end 62B and the fourth end 62D. In other exemplary embodiments, any suitable number of openings may be defined by a trolley frame for any number of roller assemblies operably engaged with the trolley frame, which is described in more detail below.

Still referring to FIG. 4, the trolley frame 62 also defines a set of notches 62H; such use and purpose of this set of notches 62H is described in more detail below. Each notch of the set of notches 62H defined by the trolley frame 62 extends into the trolley frame 62 in one of the first end 62A, second end 62B, third end 62C, and the fourth end 62D. In the illustrated embodiment, the set of notches 62H includes three notches. As illustrated, a first notch 62H1 of the set of notches 62H is defined proximate to the third 62C and extends downwardly into the trolley frame 62 from the first end 62A towards the second end 62B, a second notch 62H2 of the set of notches 62H is defined proximate between the third end 62C and the fourth end 62D and extends upwardly into the trolley frame 62 from the second end 62B towards the first end 62A, and a third notch 62H3 of the set of notches 62H is defined proximate to the fourth end 62D and extends upwardly into the trolley frame 62 from the second end 62B towards the first end 62A. In other exemplary embodiments, any suitable number of notches may be defined by a trolley frame for any number of roller assemblies operably engaged with the trolley frame, which is described in more detail below.

Still referring to FIG. 4, the trolley assembly 60 also includes at least one upper roller assembly that operably engages with the trolley frame 62. In the illustrated embodiment, the trolley assembly 60 includes first and second upper roller assemblies 64, 65 that are operably engaged with the trolley frame 62. The first and second upper roller assemblies 64 are substantially similar to one another and operably engage with the trolley frame 62 in a mirrored-image orientation. Inasmuch as the first and second upper roller assemblies 64, 65 are substantially similar to one another, the following description will relate to the first upper roller assembly 64. It should be understood, however, that the description of the first upper roller assembly 64 applies substantially equal to the second upper roller assembly 65.

Still referring to FIG. 4, the upper roller assembly 64 includes a sleeve 64A that operably engages with the trolley frame 62 inside an opening of the set of openings 62G at one of the first surface 62E and the second surface 62F. In the illustrated embodiment, the sleeve 64A operably engages with the trolley frame 62 inside the third opening 62G3 of the set of openings 62G at the first surface 62E. The upper roller assembly 64 also includes a wheel 64B that operably engages with the sleeve 64A via a connector 64C operably attaching the wheel 64B with the sleeve 64A. The wheel 64B is rotatably secured with the sleeve 64A in that the wheel 64B is rotatable about the connector 64C during operation, which is described in more detail below. As stated previously, the second upper roller assembly 65 is substantially similar to the first upper roller assembly 64; as such, a shaft 65A, a wheel 65B, and a connector 65C are substantially similar to the shaft 64A, wheel 64B, and connector 64C but operably engaged on the second surface 62F of the trolley frame 62.

Still referring to FIG. 4, the trolley assembly 60 also includes at least one lower roller assembly that operably engages with the trolley frame 62. In the illustrated embodiment, the trolley assembly 60 includes first and second upper roller assemblies 66, 67 that are operably engaged with the trolley frame 62. The first and second lower roller assemblies 66, 67 are substantially similar to one another and operably engage with the trolley frame 62 in a mirrored-image orientation. Inasmuch as the first and second lower roller assemblies 66, 67 are substantially similar to one another, the following description will relate to the first lower roller assembly 66. It should be understood, however, that the description of the first lower roller assembly 66 applies substantially equal to the second lower roller assembly 67.

Still referring to FIG. 4, the lower roller assembly 66 includes a sleeve 66A that operably engages with the trolley frame 62 inside an opening of the set of openings 62G at one of the first surface 62E and the second surface 62F. In the illustrated embodiment, the sleeve 66A operably engages with the trolley frame 62 inside the second opening 62G2 of the set of openings 62G at the first surface 62E. The lower roller assembly 66 also includes a wheel 66B that operably engages with the sleeve 66A via a connector 66C operably attaching the wheel 66B with the sleeve 66A. The wheel 66B is rotatably secured with the sleeve 66A in that the wheel 66B is rotatable about the connector 66C during operation, which is described in more detail below. As stated previously, the second lower roller assembly 67 is substantially similar to the first lower roller assembly 66; as such, a shaft 67A, a wheel 67B, and a connector 67C are substantially similar to the shaft 66A, wheel 66B, and connector 66C but operably engaged on the second surface 62F of the trolley frame 62.

Still referring to FIG. 4, the jib crane 1 also includes an upper or first tandem assembly 80 that operably engages with the trolley assembly 60 at the first opening 62G1 of the set of openings 62G. Such parts and components of the upper tandem assembly 80 is described in more detail below.

Still referring to FIG. 4, the upper tandem assembly 80 includes at least one tandem plate that operably engages with the trolley frame 62 of the trolley assembly 60. In the illustrated embodiment, the upper tandem assembly 80 includes a first tandem plate 82 that operably engages with trolley frame 62 and a second tandem plate 83 that also operably engaged with the trolley frame 62 opposite to the first tandem plate 82. The first tandem plate 82 and the second tandem plate 83 are substantially similar to the one another and operably engage with the trolley frame 62 in mirrored-image orientation. Inasmuch as the tandem plates 82, 83 are substantially similar, the following description will relate to the first tandem plate 82. It should be understood, however, that the description of the first tandem plate 82 applies substantially equal to the second tandem plate 83.

Still referring to FIG. 4, the first tandem plate 82 includes a first or front end 82A, a second or rear end 82B opposite to the first end 82A, a first surface 82C extending between the first end 82A and the second end 82B, and a second surface 82D extending between the first end 82A and the second end 82B; the first surface 82C and the second surface 82D oppose another and face away from one another. The tandem plate 82 also defines a first aperture 82E that is proximate to the first end 82A and that extends entirely through the tandem plate 82 between the first surface 82C and second surface 82D where the first surface 82C and the second surface 82D are in fluid communication with one another via the first aperture 82E. The tandem plate 82 also defines a second aperture 82F that is proximate to the second end 82B and that extends entirely through the tandem plate 82 between the first surface 82C and second surface 82D where the first surface 82C and the second surface 82D are in fluid communication with one another via the second aperture 82F. The tandem plate 82 also defines a third aperture 82G at a position between the first end 82A and the second end 82B and that extends entirely through the tandem plate 82 between the first surface 82C and second surface 82D where the first surface 82C and the second surface 82D are in fluid communication with one another via the second aperture 82F. Such use of these apertures 82E, 82F, 82G are described in more detail below.

As stated above, the first tandem plate 82 and the second tandem plate 83 are substantially similar to the one another and operably engage with the trolley frame 62 in mirrored-image orientation. As such, a first or front end 83A, a second or rear end 83B, a first surface 83C, a second surface 83D, a first aperture 83E, a second aperture 83F, and a third aperture 83G of the second tandem plate 83 is substantially similar to the first or front end 82A, the second or rear end 82B, the first surface 82C, the second surface 82D, the first aperture 82E, the second aperture 82F, and the third aperture 82G of the first tandem plate 82.

Still referring to FIG. 4, an attachment mechanism 84 operably engages the first tandem plate 82 and the second tandem plate 83 with the trolley frame 62. The attachment mechanism 83 includes a connector 84A that passes through the second apertures 82F of the first tandem plate 82 and the second tandem plate 83 and through the first opening 62G1 of the trolley frame 62 to operably engage the first tandem plate 82 and the second tandem plate 83 with the trolley frame 62. the attachment mechanism 84 may also include a nut 84B or similar device that operably engages with the connector 84A to maintain the connector 84A with the trolley frame 62 and each of the first tandem plate 82 and the second tandem plate 83.

Still referring to FIG. 4, the upper tandem assembly 80 also includes at least one pair of roller assemblies operably engaged with at least one tandem plate of the upper tandem assembly 80. In the illustrated embodiment, the upper tandem assembly 80 includes a first pair of roller assemblies 86 operably engaged with the first tandem plate 82, and a second pair of roller assemblies 88 operably engaged with the second tandem plate 83. The first pair of roller assemblies 86 and the second pair of roller assemblies 88 are substantially similar to one another and are operably engage with their respective tandem plate 82, 83 in a mirrored-image orientation. Inasmuch as the first pair of roller assemblies 86 and the second pair of roller assemblies 88 are substantially similar, the following description will relate to the first pair of roller assemblies 86 operably engaged with the first tandem plate 82. It should be understood, however, that the description of first pair of roller assemblies 86 applies substantially equal to the second pair of roller assemblies 88.

Still referring to FIG. 4, each roller assembly of the pair of roller assemblies 86 includes a sleeve 86A that operably engages with the first tandem plate 82 inside one of the apertures 82E, 82F, 82G at one of the first surface 82C and the second surface 82D. In the illustrated embodiment, the sleeves 86A operably engage with the first tandem plate 82 inside the first and second apertures 82E, 82F at the first surface 82C. Each roller assembly of the pair of roller assemblies 86 also includes a wheel 86B that operably engages with the sleeve 86A via a connector 86C operably attaching the wheel 86B with the sleeve 86A. Each wheel 86B is rotatably secured with the respective sleeve 86A in that each wheel 86B is rotatable about the respective connector 86C during operation, which is described in more detail below. As stated previously, each roller assembly of the second pair of roller assemblies 88 is substantially similar to each roller assembly of the first pair of roller assemblies 86; as such, a shaft 88A, a wheel 88B, and a connector 88C illustrated in FIG. 4B are substantially similar to the shaft 86A, wheel 86B, and connector 86C but operably engaged with the second tandem plate 83. Such use and purpose of the first and second pairs of roller assemblies 86, 88 of the upper tandem assembly 80 is described in more detail below.

Still referring to FIG. 4, the jib crane 1 also includes a lower or second tandem assembly 90 that operably engages with the trolley assembly 60 at the fourth opening 62G4 of the set of openings 62G. In the illustrated embodiment, the lower tandem assembly 90 is vertically below the upper tandem assembly 80 on the trolley frame 62. Such parts and components of the lower tandem assembly 90 is described in more detail below.

Still referring to FIG. 4, the upper tandem assembly 90 includes at least one tandem plate that operably engages with the trolley frame 62 of the trolley assembly 60. In the illustrated embodiment, the upper tandem assembly 90 includes a first tandem plate 92 that operably engages with trolley frame 62 and a second tandem plate 93 that also operably engages with the trolley frame 62 opposite to the first tandem plate 92. The first tandem plate 92 and the second tandem plate 93 are substantially similar to the one another and operably engage with the trolley frame 62 in mirrored-image orientation. Inasmuch as the tandem plates 92, 93 are substantially similar, the following description will relate to the first tandem plate 92. It should be understood, however, that the description of the first tandem plate 92 applies substantially equal to the second tandem plate 93.

Still referring to FIG. 4, the first tandem plate 92 includes a first or front end 92A, a second or rear end 92B opposite to the first end 92A, a first surface 92C extending between the first end 92A and the second end 92B, and a second surface 92D extending between the first end 92A and the second end 92B; the first surface 92C and the second surface 92D oppose another and face away from one another. The tandem plate 92 also defines a first aperture 92E that is proximate to the first end 92A and that extends entirely through the tandem plate 92 between the first surface 92C and second surface 92D where the first surface 92C and the second surface 92D are in fluid communication with one another via the first aperture 92E. The tandem plate 92 also defines a second aperture 92F that is proximate to the second end 92B and that extends entirely through the tandem plate 92 between the first surface 92C and second surface 92D where the first surface 92C and the second surface 92D are in fluid communication with one another via the second aperture 92F. The tandem plate 92 also defines a third aperture 92G at a position between the first end 92A and the second end 92B and that extends entirely through the tandem plate 92 between the first surface 92C and second surface 92D where the first surface 92C and the second surface 92D are in fluid communication with one another via the second aperture 92F. Such use of these apertures 92E, 92F, 92G are described in more detail below.

As stated above, the first tandem plate 92 and the second tandem plate 93 are substantially similar to the one another and operably engage with the trolley frame 62 in mirrored-image orientation. As such, a first or front end 93A, a second or rear end 93B, a first surface 93C, a second surface 93D, a first aperture 93E, a second aperture 93F, and a third aperture 93G of the second tandem plate 93 is substantially similar to the first or front end 92A, the second or rear end 92B, the first surface 92C, the second surface 92D, the first aperture 92E, the second aperture 92F, and the third aperture 92G of the first tandem plate 92.

Still referring to FIG. 4, an attachment mechanism 94 operably engages the first tandem plate 92 and the second tandem plate 93 with the trolley frame 92. The attachment mechanism 93 includes a connector 94A that passes through the second apertures 92F of the first tandem plate 92 and the second tandem plate 93 and through the fourth opening 62G4 of the trolley frame 62 to operably engage the first tandem plate 92 and the second tandem plate 93 with the trolley frame 62. the attachment mechanism 94 may also include a nut 94B or similar device that operably engages with the connector 94A to maintain the connector 94A with the trolley frame 92 and each of the first tandem plate 92 and the second tandem plate 93.

Still referring to FIG. 4, the lower tandem assembly 90 also includes at least one pair of roller assemblies operably engaged with at least one tandem plate of the lower tandem assembly 90. In the illustrated embodiment, the lower tandem assembly 90 includes a first pair of roller assemblies 96 operably engaged with the first tandem plate 92, and a second pair of roller assemblies 98 operably engaged with the second tandem plate 93. The first pair of roller assemblies 96 and the second pair of roller assemblies 98 are substantially similar to one another and are operably engage with their respective tandem plate 92, 93 in a mirrored-image orientation. Inasmuch as the first pair of roller assemblies 96 and the second pair of roller assemblies 98 are substantially similar, the following description will relate to the first pair of roller assemblies 96 operably engaged with the first tandem plate 92. It should be understood, however, that the description of first pair of roller assemblies 96 applies substantially equal to the second pair of roller assemblies 98.

Still referring to FIG. 4, each roller assembly of the pair of roller assemblies 96 includes a sleeve 96A that operably engages with the first tandem plate 92 inside one of the apertures 92E, 92F, 92G at one of the first surface 92E and the second surface 92F. In the illustrated embodiment, the sleeves 96A operably engage with the first tandem plate 92 inside the first and second apertures 92E, 92F at the first surface 92C. Each roller assembly of the pair of roller assemblies 96 also includes a wheel 96B that operably engages with the sleeve 96A via a connector 96C operably attaching the wheel 96B with the sleeve 96A. Each wheel 96B is rotatably secured with the respective sleeve 96A in that each wheel 96B is rotatable about the respective connector 96C during operation, which is described in more detail below. As stated previously, each roller assembly of the second pair of roller assemblies 98 is substantially similar to each roller assembly of the first pair of roller assemblies 96; as such, a shaft 98A, a wheel 98B, and a connector 98C illustrated in FIG. 4B are substantially similar to the shaft 96A, wheel 96B, and connector 96C but operably engaged with the second tandem plate 93. Such use and purpose of the first and second pairs of roller assemblies 96, 98 of the lower tandem assembly 90 is described in more detail below.

Figure 3:
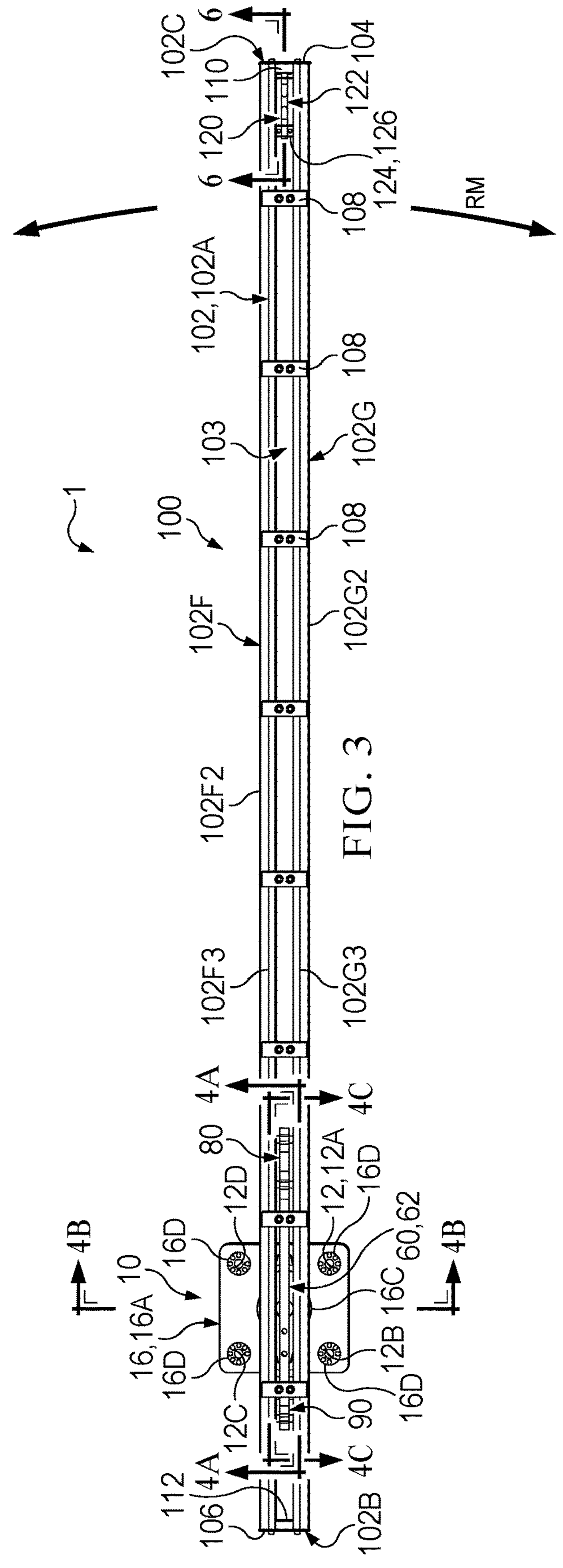
FIG. 3 is a top plan view of the open column jib crane in accordance with an aspect of the present disclosure.

Referring to FIGS. 1-3, the jib crane 1 also includes a crane beam assembly 100 that operably engages with each of the trolley assembly 80, the upper tandem assembly 80, and the lower tandem assembly 90. Specifically, a crane beam or boom 102 of the crane beam assembly 100 operably engages with each of the trolley assembly 80, the upper tandem assembly 80, and the lower tandem assembly 90. As described in more detail below, the crane beam 102 is rotatable about the longitudinal axis 10C of the open column 10, via the bearing assembly 30, and is longitudinal moveable (e.g., aft and fore moveable) relative to the open column 10 via the trolley assembly 80, the upper tandem assembly 80, and the lower tandem assembly 90. Such assemblies, components, and parts of the crane beam 102 are described in further detail below.

Referring to FIG. 2, the crane beam 102 includes a first or top end 102A, a second or bottom end 102B opposite to the first end 102A, a third or front end 102C positioned between the first end 102A and the second end 102B, and a fourth or rear end 102D positioned between the first end 102A and the second end 102B and opposite to the third end 102C, and a longitudinal axis 102E defined between the third end 102C and the fourth end 102D.

The crane beam 102 also includes a first strut 102F and a second strut 102G that forms the crane beam 102. In the illustrated embodiment, the first strut 102G and 102F and the second strut 102G are substantially similar to one another and are operably engaged with the bearing assembly 30 and the trolley assembly 60 in a mirrored-image orientation. Inasmuch as the first strut 102F and the second strut 102G are substantially similar to one another, the following description will relate to the first strut 102F. It should be understood, however, that the description of the first strut 102F applies substantially equal to the second strut 102G.

Figure 6:
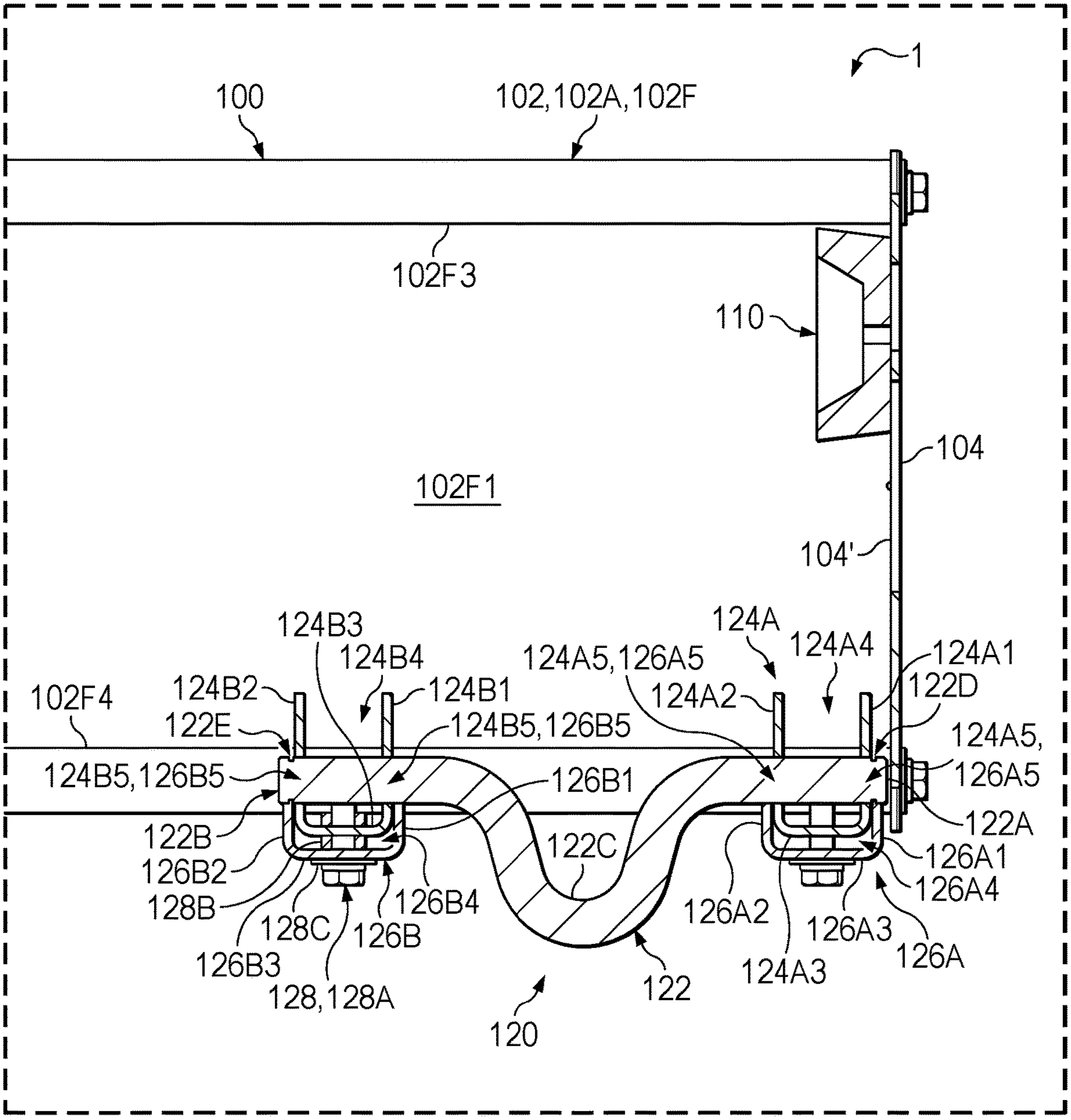
FIG. 6 is a partial sectional view of the crane beam and the hanger assembly of the open column jib crane taken in the direction of line 5-5 in FIG. 3.

As illustrated in FIG. 2, the first strut 102F includes an interior surface 102F1 that extends between the third end 102C to the fourth end 102D. The first strut 102F also includes an exterior surface 102F2 that extends between the third end 102C to the fourth end 102D and that is opposite to the interior surface 102F1 and faces away from the interior 102F1. The first strut 102F also includes a first or upper rail 102F3 that extends laterally away from the interior surface 102F1 and towards the second strut 102G. The illustrated upper rail 102F3 is positioned at the top end 102A of the crane beam 102. The illustrated upper rail 102F3 is also extends between the third end 102C and the fourth end 102D along the longitudinal axis 102E. The first strut 102F also includes a second or lower rail 102F4 that extends laterally away from the interior surface 102F1 and towards the second strut 102G. The illustrated lower rail 102F4 is positioned at the bottom end 102B of the crane beam 102. The illustrated lower rail 102F4 is also extends between the third end 102C and the fourth end 102D along the longitudinal axis 102E. As illustrated in FIGS. 4 and 6, the upper rail 102F3 and the lower rail 102F4 oppose one another on the first strut 102F in which the upper rail 102F3 is positioned vertically above the lower rail 102F4. The upper rail 102F3 and the lower rail 102F4 are also parallel with one another.

As stated above, the first strut 102F and the second strut 102G are substantially similar to one another and operably engaged with the bearing assembly 30 and the trolley assembly 60 in a mirrored-image orientation. As such, an interior surface 102G1, an exterior surface 102G2, an upper rail 102G3, and a lower rail 102G4 of the second strut 102G is substantially similar to the interior surface 102F1, the exterior surface 102F2, the upper rail 102F3, and the lower rail 102F4 of the second strut 102G in a mirrored-image orientation.

As illustrated in FIG. 4, the upper rails 102F3, 102G3 and the lower rail 102F4, 102G4 of the first strut 102F and the second strut 102G are configured to receive and engage with the trolley assembly 60, the upper tandem assembly 80, and the lower tandem assembly 90. In particular, the upper roller assemblies 64, 65 of the trolley assembly 60 and the upper tandem assembly 80 ride along the upper rails 102F3, 102G3 of the first strut 102F and the second strut 102G during operation. Similarly, the lower roller assemblies 66, 67 of the trolley assembly 60 and the lower tandem assembly 90 ride along the lower rails 102F4, 102G4 of the first strut 102F and the second strut 102G during operation. During operation, the crane beam 100 is enabled to slideably move along the trolley assembly 60 and the upper and lower tandem assemblies 80, 90, if desired, to move the crane beam 102 aft and fore along the longitudinal axis 102E of the crane beam 102. During operation, the crane beam 102 is also configured to rotatably move about the longitudinal axis 10C of the open column 10 via the engagement between the bearing assembly 30 and the trolley assembly 60.

Referring to FIGS. 1 and 6, at least one endplate operably engages with the first strut 102F and the second strut 102G of the crane beam 102. In the illustrated embodiment, a first endplate 104 operably engages with the crane beam 102 at the third end 102C. Specifically, an interior surface 104' defined by the first endplate 104 operably engages with the first strut 102F and the second strut 102G at the third end 102C of the crane beam 102. Additionally, the first endplate 104 is attached to the crane beam 102 via connectors and/or bolts fastened to the front end 102C of the crane beam 102. In the illustrated embodiment, a second endplate 106 operably engages with the crane beam 102 at the fourth end 102D. Specifically, an interior surface 106' defined by the second endplate 106 operably engages with the first strut 102F and the second strut 102G at the fourth end 102D of the crane beam 102. Additionally, the second endplate 106 is attached to the crane beam 102 via connectors and/or bolts fastened to the rear end 102D of the crane beam 102.

Referring to FIGS. 1 and 6, at least one cross support bracket assembly 108 operably engages with the crane beam 102. The at least one cross support bracket assembly 108 operably engages with the first strut 102F and the second strut 102G of the crane beam 102 at the first end 102A of the crane beam 102. The at least one cross support bracket assembly 108 may be configured to maintain the first strut 102F and the second strut 102G with one another along the first end 102A of the crane 102 in conjunction with the first endplate 104 and the second endplate 106 operably engaging the first strut 102F and the second strut 102G with one another at the third end 102C and the fourth end 102D. In the illustrated embodiment, eight cross support bracket assemblies 108 operably engage the first strut 102F and the second strut 102G with one another along the first end 102A of the center beam 102. In other exemplary embodiments, any suitable number of cross support bracket assemblies may be used to operably engage a first strut and a second strut with one another at any end. Such components and parts of the at least one cross support bracket assembly 108 are described in more detail below.

As illustrated in FIG. 4, the at least one cross support bracket assembly 108 includes a top bracket 108A that operably engages with the exterior surface 102F2 of the first strut 102F and the exterior surface 102G2 of the second strut 102G. The top bracket 108A is configured to receive the upper rails 102F3, 102G3 of the first strut 102F and the second strut 102G in which the top bracket 108A does not impede or hinder the crane beam 102 from riding along the trolley assembly 60, the upper tandem assembly 80, and the lower tandem assembly 90 during operation.

In the illustrated embodiment, the top bracket 108A has a first wall 108A1, a second wall 108A2 opposite to the first wall 108A1, and a third wall 108A3 operably engaged with the first wall 108A1 and the second wall 108A2. A cavity 108A4 is collectively defined by the first wall 108A1, the second wall 108A2, and the third wall 108A3. Each of the first wall 108A1 and the second wall 108A2 defines a set of channels 108A5 that extend into each of the first wall 108A1 and the second wall 108A2 towards the third wall 108A3. The set of channels 108A5 are configured to receive and house the upper channels 102F3, 102G3 of the first strut 102F and the second strut 102G in order to enable the top bracket 108A to operably engage with the first strut 102F and the second strut 102G.

As illustrated in FIG. 4, the at least one cross support bracket assembly 108 includes a bottom bracket 108B that operably engages with the interior surface 102F1 of the first strut 102F and the interior surface 102G1 of the second strut 102G and operably engages with the top bracket 108B. The bottom bracket 108B is configured to receive the upper rails 102F3, 102G3 of the first strut 102F and the second strut 102G in which the bottom bracket 108B does not impede or hinder the crane beam 102 from riding along the trolley assembly 60, the upper tandem assembly 80, and the lower tandem assembly 90 during operation. As described in more detail below, the bottom bracket 108B is housed inside of the top bracket 108A when the top bracket 108A and the bottom bracket 108B operably engage with one another. As shown in FIGS. 1 and 4, the combination of the top bracket 108A and the bottom bracket 108B create an interlocking mechanism to operably engage the first strut 102F and the second strut 102G with one another.

In the illustrated embodiment, the bottom bracket 108B defines a first depression 108B1 and a second depression 10862 that extend into the bottom bracket 108B. As illustrated in FIGS. 4A and 4B, the first depression 108B1 and the second depression are sized and configured to receive the upper rails 102F3, 102G3 of the first strut 102F and the second strut 102G; as such, the bottom bracket 108B operably engages with the interior surfaces 102F1, 102G1 of the first strut 102F and the second strut 102G via the upper rails 102F3, 102G3.

Referring to FIGS. 4A and 4B, the at least one cross support bracket assembly 108 also includes at least one attachment mechanism 108C that operably engages the top bracket 108A and the bottom bracket 108B with one another. As illustrated in FIG. 4A, a fastener 108C1 of the at least one attachment mechanism 108C passes through an opening (not illustrated) in the third wall 108A3 of the top bracket 108A and an opening (not illustrated) in the bottom bracket 1086. A threaded clip 108C2 of the at least one attachment mechanism 108C threadably engages and/or releasably attaches with the fastener 108C1 to maintain the fastener 108C1 with the top bracket 108A and the bottom bracket 108B. A lock washer 108C3 of the at least one attachment mechanism 108C is also operably engaged with the head of the fastener 108C1 to prevent movement and/or rotation of the fastener 108C1 that may lead to backing out the fastener 108C1 from the threaded clip 108C2. In each illustrated cross support bracket assembly 108, two attachment mechanism 108C operably engage a top bracket 108A with a respective bottom bracket 108B in each illustrated cross support bracket assembly 108.

Referring to FIGS. 1, 3, and 7, the crane beam assembly 100 also includes at least one stopper operably engaged with at least one endplate of the crane beam assembly 100. In the illustrated embodiment, a first stopper 110 operably engages with the first endplate 104 on the interior surface 104' of the first endplate 104, and a second stopper 112 operably engages with the second endplate 106 on the interior surface 106' of the second endplate 106. Each of the first and second stopper 110, 112 limits longitudinal travel of the crane beam 102 and other assemblies and/or components operably engaged with the crane beam 102 at either the front end 102C of the crane beam 102 or the rear end 102D of the crane beam 102.

Referring to FIGS. 1, 3, 5 and 6, the jib crane 1 also includes at least one hanger assembly 120 that operably engages with the crane beam 102. More particularly, the at least one hanger assembly 120 operably engages with the lower rails 102F4, 102G4 of the first strut 102F and the second strut 102G. As described in more detail below, the at least one hanger assembly 120 is configured to ride along the lower rails 102F4, 102G4 of the first strut 102F and the second strut 102G between the trolley assembly 60 and the first endplate 104. In the illustrated embodiment, a single hanger assembly 120 operably engages with the lower rails 102F4, 102G4 of the first strut 102F and the second strut 102G. In other exemplary embodiments, any suitable number of hanger assemblies as described herein may be operably engaged with any portion of a crane beam as described herein.

Figure 5:
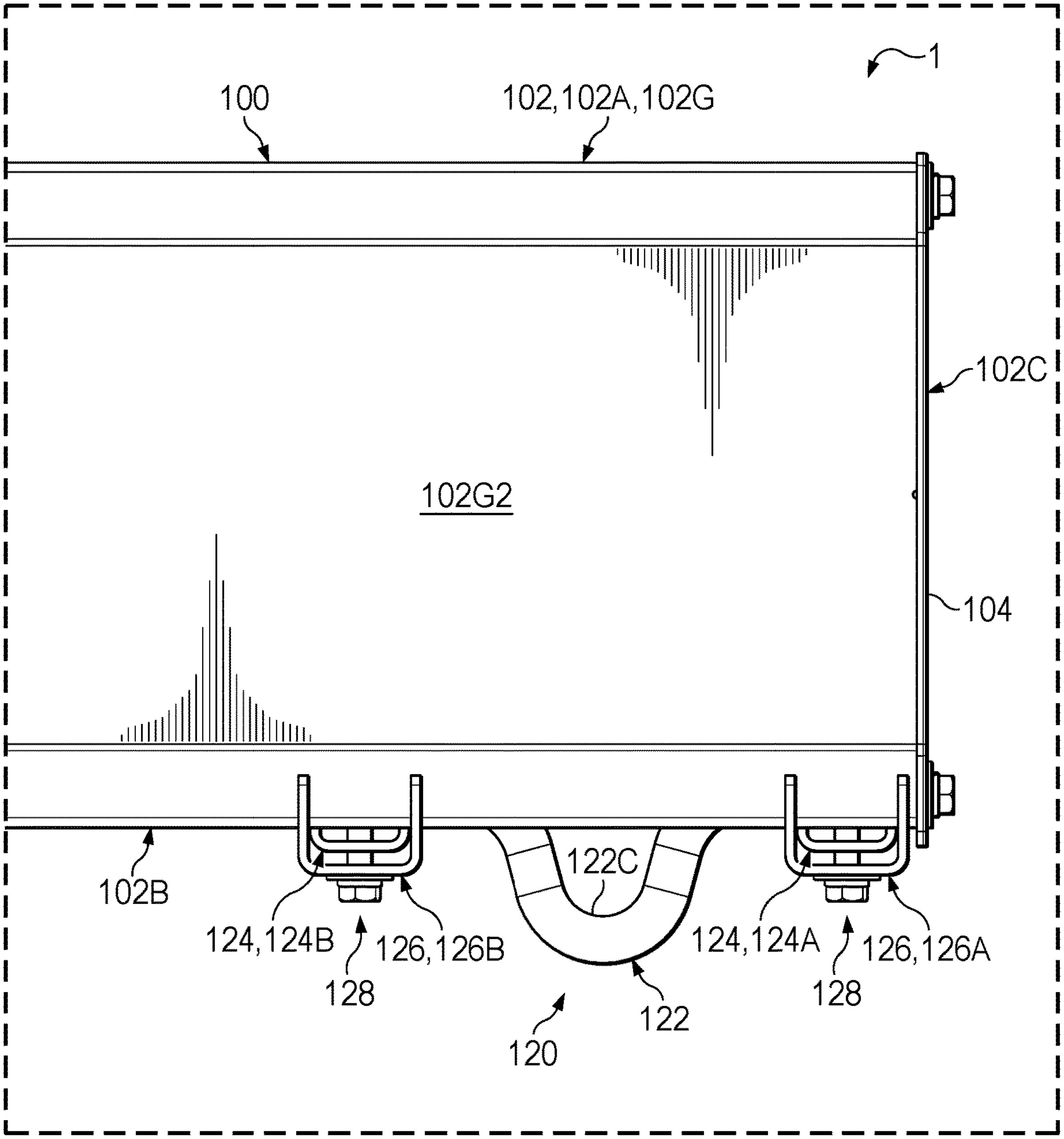
FIG. 5 is an enlargement view of the highlighted region shown in FIG. 5.

Referring to FIGS. 5 and 6, the hanger assembly 120 includes a hanger 122 that defines a U-shape configuration. The hanger 122 includes a first or front end 122A, a second or rear end 122B opposite to the first end 122A, and an arcuate and/or curvilinear portion 122C defined between the first end 122A and the second end 122B and extends downwardly away from the first end 122A and the second end 122B. The arcuate portion 122C defined in the hanger 122 is configured to receive a chain, rope, or other similar components of the like that may operably engage with both the hanger 122 and an object meant to be lifted and/or moved by the jib crane 1. Any suitable component may be used for operably engaging with both the hanger 122 and an object meant to be lifted and/or moved by the jib crane 1. Additionally, the hanger 122 also defines a first groove 122D that extends circumferentially into the hanger 122 proximate to the first end 122A. The hanger 122 also defines a second groove 122E that extends circumferentially into the hanger 122 proximate to the second end 122B. Such use and purpose of these first groove 122D and the second groove 122E are described in more detail below.

Referring to FIG. 6, the hanger assembly 120 also includes a set of upper brackets 124 that operably engages with the lower rails 102F4, 102G4 of the first strut 102F and the second strut 102G and the hanger 122. As illustrated in FIG. 6, the set of upper brackets 124 includes a first upper bracket 124A and a second upper bracket 1246 that operably engage with the lower rails 102F4, 102G4 of the first strut 102F and the second strut 102G and the hanger 122. The first upper bracket 124A and the second upper bracket 124B are substantially similar to one another and operably engage with the lower rails 102F4, 102G4 of the first strut 102F and the second strut 102G and the hanger 122 in the same orientation. Inasmuch as the first upper bracket 124A and the second upper bracket 124B are substantially similar to one another, the following description will relate to the first upper bracket 124A. It should be understood, however, that the description of the first upper bracket 124A applies substantially equal to the second upper bracket 124B.

As illustrated in FIG. 6, the first upper bracket 124A includes a first wall 124A1, a second wall 124A2 opposite to the first wall 124A1, and a third wall 124A3 operably engaged with the first wall 124A1 and the second wall 1024A2. A cavity 124A4 is collectively defined by the first wall 124A1, the second wall 124A2, and the third wall 124A3. Additionally, the first upper bracket 124A defines central through-holes 124A5 in the first wall 124A1 and the second wall 124A2. The central through-holes 124A5 are configured to receive a portion of the hanger 122 where the first end 122A and the first groove 122D are positioned proximate to the first wall 124A1 and outside of the cavity 124A4. As illustrated in FIG. 6, the first upper bracket 124A operably engages with the lower rails 102F4, 102G4 of the first strut 102F and the second strut 102G along the interior surfaces 102F1, 102F2 of the first strut 102F and the second strut 102G.

As stated above, the first upper bracket 124A and the second upper bracket 124B are substantially similar to one another. As such, a first wall 12461, a second wall 12462, a third wall 12463, a cavity 124E34, and central through-holes 12465 of the second upper bracket 124B of the set of upper brackets 124 are substantially similar to the first wall 124A1, second wall 124A2, third wall 124A3, cavity 124A4, and central through-holes 124A5 of the first upper bracket 124A. As illustrated in FIG. 6, the central through-holes 12465 are configured to receive a portion of the hanger 122 where the second end 122B and the second groove 122E are positioned proximate to the second wall 124E32 and outside of the cavity 124E34.

Still referring to FIG. 6, the hanger assembly 120 also includes a set of lower brackets 126 that operably engages with the lower rails 102F4, 102G4 of the first strut 102F and the second strut 102G and the hanger 122 and the set of upper brackets 124. As illustrated in FIG. 6, the set of lower brackets 126 includes a first lower bracket 126A and a second lower bracket 126B that operably engage with the lower rails 102F4, 102G4 of the first strut 102F and the second strut 102G and the hanger 122. The first lower bracket 126A and the second lower bracket 126B are substantially similar to one another and operably engage with the lower rails 102F4, 102G4 of the first strut 102F and the second strut 102G and the hanger 122 and the set of upper brackets 124 in the same orientation. Inasmuch as the first lower bracket 126A and the second lower bracket 126B are substantially similar to one another, the following description will relate to the first lower bracket 126B. It should be understood, however, that the description of the first lower bracket 126B applies substantially equal to the second lower bracket 126B.

As illustrated in FIG. 6, the first lower bracket 126A includes a first wall 126A1, a second wall 126A2 opposite to the first wall 126A1, and a third wall 126A3 operably engaged with the first wall 126A1 and the second wall 126A2. A cavity 126A4 is collectively defined by the first wall 126A1, the second wall 126A2, and the third wall 126A3. Additionally, the first upper bracket 126A defines central through-holes 126A5 in the first wall 126A1 and the second wall 126A2. The central through-holes 126A5 are configured to receive a portion of the hanger 122 where the first end 122A and the first groove 122D are positioned proximate to the first wall 126A1 and outside of the cavity 126A4. As illustrated in FIG. 6, the first lower bracket 126A operably engages with the lower rails 102F4, 102G4 of the first strut 102F and the second strut 102G along the exterior surfaces 102F2, 102G2 of the first strut 102F and the second strut 102G. Still referring to FIG. 6, the first lower bracket 126A is configured to be housed inside of the cavity 124A5 of the first upper bracket 124A when operably engaged with the first upper bracket 124A, which is described in more detail below.

As stated above, the first lower bracket 126A and the second lower bracket 126B are substantially similar to one another. As such, a first wall 12661, a second wall 12662, a third wall 12663, a cavity 126E34, and central through-holes 12665 of the second lower bracket 126B of the set of lower brackets 126 are substantially similar to the first wall 126A1, second wall 126A2, third wall 126A3, cavity 126A4, and central through-holes 126A5 of the first upper bracket 126A. As illustrated in FIG. 6, the central through-holes 12465 are configured to receive a portion of the hanger 122 where the second end 122B and the second groove 122E are positioned proximate to the second wall 126E32 and outside of the cavity 126E34.

Still referring to FIG. 6, sets of attachment mechanisms 128 operably engage each upper bracket of the set of upper brackets 124 with a respective lower bracket of the set of lower brackets 126. In the illustrated embodiment, each upper bracket of the set of upper brackets 124 operably engages with a respective lower bracket of the set of lower brackets 126 via two attachment mechanisms 128. In other exemplary embodiments, any suitable number of attachment mechanisms may be used to operably engage an upper bracket of a set of upper brackets with a respective lower bracket of a set of lower brackets.

Still referring to FIG. 6, each attachment mechanism of the sets of attachment mechanisms 128 includes a fastener 128A that passes through openings (not illustrated) defined in a respective upper bracket of the set of upper brackets 124 and in a respective lower bracket of the set of lower brackets 126. In one instance, a fastener 128A passes through an opening defined in the third wall 124A3 of the first upper bracket 124A and an opening defined in the third wall 126A3 of the first lower bracket 126A. Each attachment mechanism of the sets of attachment mechanisms 128 also includes a threaded clip 128B that threadably engages with a respective fastener 128A and operably engages with a lower bracket in the set of the lower brackets 126. As illustrated in FIG. 6, a threaded clip 128B of an attachment mechanism of the sets of attachment mechanism 128 operably engages with the first lower bracket 126A and threadably engages with a respective fastener 128A. Such engagement between the fastener 128A and the threaded clip 128B in each attachment mechanism of the sets of attachment mechanisms 128 operably engages an upper bracket of the set of upper brackets 124 and a respective lower bracket of the set of lower brackets 126 with one another. In one instance, two sets of attachment mechanisms from the set of attachment mechanisms 128 operably engage the first upper bracket 124A of the set of upper brackets 124 and the first lower bracket 126A of the set of lower brackets 126 with one another. In another instance, two sets of attachment mechanisms from the set of attachment mechanisms 128 operably engage the second upper bracket 124B of the set of upper brackets 124 and the second lower bracket 126B of the set of lower brackets 126 with one another. Additionally, the sets of attachment mechanism 128 may include lock washers 128C that operably engage with the fasteners 128A to prevent movement and/or rotation of the fasteners 128A during operation (i.e., prevent fasteners 128A from backing out of the threaded-clips 128B).

While not illustrated herein, a set of cotter pins may operably engage with the hanger 122 inside of the first groove 122D and the second groove 122E to prevent lateral movement of the hanger 122 inside of the set of upper brackets 124 and the set of lower brackets 126. In one instance, a first cotter pin may operably engage with the hanger 122 inside of the first groove 122D and directly abut the first wall 124A1 of the first upper bracket 124A; such engagement between the first cotter pin, the hanger 122, and the first upper bracket 124A may prevent lateral movement of the hanger 122 at the first end 122A. In another instance, a second cotter pin may operably engage with the hanger 122 inside of the second groove 122E and directly abut the second wall 124E32 of the second upper bracket 124B; such engagement between the second cotter pin, the hanger 122, and the second upper bracket 124B may prevent lateral movement of the hanger 122 at the second end 1226.

Having now described the assemblies and components of the jib crane 1, a method of using the jib crane 1 is described in more detail below.

During operation, an operator of the jib crane 1 may desire to move and/or translate a desired object from a first position to a second position at a distance away from the first position. As described above, the jib crane 1 enables the operator to move the desired object either angularly (i.e. rotational movement) or linearly (aft and fore movement) from the first position to the second position at a distance away from the first position.

If the operator desires to angularly move the desired object with the jib crane 1, the operator must rotate the crane beam assembly 100 about the longitudinal axis 10C of the open column 10. To perform this task, the shaft 36 of the bearing assembly 30 rotates inside one or both of the first thrust bearing 32 and the second thrust bearing 34. In the current example, the operator may manually rotate the crane beam 102 of the crane beam assembly 100 in either a clockwise direction or a counterclockwise direction based on where the place the desired object. While not illustrated herein, an auxiliary power mechanism and/or apparatus (i.e. a motor operably connected with the shaft 36) may be adapted to automatically rotate the shaft 36 in either a clockwise direction or a counterclockwise direction. Such rotational movement of the crane beam 102 via the bearing assembly 30 is denoted by a double arrow labeled "R1" in FIG. 3. During operation, the operator may continue to rotate the crane beam 102 circumferentially about the longitudinal axis 10C of the open column 10 via the bearing assembly 30. In other words, the operator may continue to rotate the crane beam 102 three-hundred and sixty degrees about the longitudinal axis 10C of the open column 10 via the bearing assembly 30.

If the operator desires to longitudinally move the desired object with the jib crane 1, the operator must longitudinally move the crane beam assembly 100 along one or all of the trolley assembly 60, the upper tandem assembly 80, and the lower tandem assembly 90 in the aft and fore directions. During operation, the crane beam 102 may slidably move along at least the upper roller assembly 64, 65 and the lower roller assembly 66, 67 of the trolley assembly 60 in the aft and fore directions relative to the open column 10. More particularly, the upper and lower rails 102F3, 102F4, 102G3, 102G4 of the first and second struts 102F, 102G ride along at least the wheels 64B, 65B, 66B, 67B of the upper roller assemblies 64, 65 and the lower roller assemblies 66, 67 of the trolley assembly 60 in the aft and fore directions relative to the open column 10. The upper and lower rails 102F3, 102F4, 102G3, 102G4 of the first and second struts 102F, 102G also ride along the wheels 86A, 88A of the roller assemblies 86, 88 of the upper tandem assembly 80 in the aft and fore directions relative to the open column 10. The upper and lower rails 102F3, 102F4, 102G3, 102G4 of the first and second struts 102F, 102G also ride along the wheels 96A, 98A of the roller assemblies 96, 98 in the aft and fore directions relative to the open column 10. Such movement of the crane beam assembly 100 in the aft and fore direction relative to the open column 10 may be performed manually by the operator. While not illustrated herein, an auxiliary power mechanism and/or apparatus (i.e. a motor operably connected with the crane beam 102) may be adapted to automatically move the shaft 36 in the aft and fore directions relative to the open column 10.

FIG. 7 illustrates a method 200 of moving an object with a jib crane between a first position and a second position. An initial step 202 of the method 200 comprises engaging a bearing assembly of the jib crane with an open column of the jib crane, wherein the bearing assembly includes at least one bearing positioned inside of the open column. Another step 204 of the method 200 comprises attaching the object, via a hanger assembly, with the jib crane. Another step 206 of the method 200 comprises moving the object with the jib crane between the first position and the second position.

In other exemplary embodiments, method 200 of moving an object with a jib crane between a first position and a second position may include additional and/or optional steps. An optional step may include rotating a crane beam of the jib crane, via the bearing assembly, about open column of the jib crane. An optional step may include moving the object longitudinally, via the hanger assembly, between a first end of the crane beam and the second end of the crane beam. An optional step may include moving the crane beam longitudinally, via a trolley assembly, in aft and fore directions relative to the open column.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc.

Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A jib crane, comprising:

an open column having a first end and a second end opposite to the first end, wherein the second end is adapted to directly attach to a ground surface;

at least one interior space collectively defined by the open column between the first end and the second end;

a crane beam operably engaged with the open column at the first end of the open column;

a bearing assembly operably engaged with the crane beam and the open column, the bearing assembly comprises a tube having a first end that operably engages with the crane beam and a second end opposite to the first end, at least one bearing positioned inside of the at least one interior space defined by the open column and operably engages with the tube and the open column, and a mounting plate directly attached to the first end of the tube; and a trolley assembly operably engaged with the crane beam and the bearing assembly and directly attached to the mounting plate.

2. The jib crane of claim 1, wherein the crane beam is rotatably moveable about the open column via the bearing assembly.

3. The jib crane of claim 1, wherein the crane beam is longitudinally moveable in aft and fore directions relative to the open column.

4. The jib crane of claim 1, further comprising:

at least one support plate operably engaging the open column at the first end of the open column.

5. The jib crane of claim 4, wherein the at least one support plate comprises:

a top surface;

a bottom surface opposite to the top surface; and a through-hole defined by the at least one support plate extending from the top surface to the bottom surface;

wherein the through-hole is configured to receive the at least one bearing in which the at least one support plate and the at least one bearing operably engage with one another.

6. The jib crane of claim 5, wherein the bearing assembly further comprises:

a second bearing operably engaged with the tube between the first end of the tube and the second end of the tube and operably engaged with the open column;

wherein the second bearing opposes the at least one bearing on the tube; and wherein the second bearing is positioned inside of the at least one interior space defined by the open column.

7. The jib crane of claim 6, further comprising:

a second support plate operably engaging the open column at a position between the first end of the open column and the second end of the open column;

wherein the second support plate is vertically below the at least one support plate on the open column.

8. The jib crane of claim 7, wherein the second support plate comprises:

a top surface;

a bottom surface opposite to the top surface; and a through-hole defined by the at least another support plate extending from the top surface to the bottom surface;

wherein the through-hole is configured to receive the second bearing in which the second support plate and the second bearing operably engaged with one another.

9. The jib crane of claim 4, wherein the crane beam is configured to be longitudinally moveable along the trolley assembly in aft and fore directions relative to the open column.

10. The jib crane of claim 9, wherein the trolley assembly comprises:

a trolley frame operably engaged with the mounting plate of the bearing assembly; and at least one roller assembly operably engaged with the at least one support plate and the crane beam;

wherein the at least one roller assembly is configured to enable longitudinal movement of the crane beam in the aft and fore directions relative to the open column.

11. The jib crane of claim 10, wherein the crane beam further comprises:

a first strut;

a second strut operably engaged with the first strut; and a channel collectively defined between the first strut and the second strut;

wherein the trolley assembly is operably engaged with the crane beam between the first strut and the second strut inside the channel.

12. The jib crane of claim 10, wherein the crane beam further comprises:

a first end;

a second end opposite to the first end of the crane beam; and at least one rail extending between the first end of the crane beam and the second end of the crane beam;

wherein the at least one rail is configured to receive the at least one roller assembly in which the crane beam and the at least one roller assembly operably engage with one another.

13. The jib crane of claim 12, wherein the trolley assembly further comprises:

a second roller assembly operably engaged with the support plate and the crane beam;

and wherein the crane beam further comprises:

a second rail extending between the first end of the crane beam and the second end of the crane beam;

wherein the second rail is configured to receive the second roller assembly in which the crane beam and the second roller assembly operably engage with one another.

14. The jib crane of claim 13, wherein the second roller assembly is positioned vertically below the at least one roller assembly on the support plate.

15. The jib crane of claim 13, wherein the second rail is positioned vertically below the at least one rail on the crane beam.

16. The jib crane of claim 1, further comprising:

a hanger assembly operably engaged with the crane beam;

wherein the hanger assembly is configured to be longitudinal moveable along the crane beam.

17. A method of moving an object with a jib crane between a first position and a second position, comprising steps of:

engaging a bearing assembly of the jib crane with an open column of the jib crane, wherein the bearing assembly includes a tube having a first end that operably engages with a crane beam of the jib crane and a second end opposite to the first end, at least one bearing positioned inside of the open column and operably engages with the tube and the open column, and a mounting plate directly attached to the first end of the tube;

engaging a trolley assembly to the crane beam and the bearing assembly and being directly attached to the mounting plate;

attaching the object, via a hanger assembly, with the jib crane; and moving the object with the jib crane between the first position and the second position.

18. The method of claim 17, further comprising:

rotating a crane beam of the jib crane, via the bearing assembly, about the open column of the jib crane.

19. The method of claim 18, further comprising:

moving the object longitudinally, via the hanger assembly, between a first end of the crane beam and the second end of the crane beam.

20. The method of claim 18, further comprising:

moving the crane beam longitudinally, via the trolley assembly, in aft and fore directions relative to the open column.

21. A jib crane, comprising:

an open column having a first end and a second end opposite to the first end that is adapted to operably engage with a ground surface;

at least one interior space collectively defined by the open column between the first end and the second end;

a crane beam operably engaged with the open column at the first end of the open column; and a bearing assembly operably engaged with the crane beam and the open column, the bearing assembly having:

a tube having a first end that operably engages with the crane beam and a second end opposite to the first end;

a mounting plate operably engaged with the first end of the tube;

at least one bearing positioned inside of the at least one interior space defined by the open column and operably engages with the tube between the first end of the tube and the second end of the tube and operably engages with the open column; and at least one support plate operably engaging the open column at the first end of the open column, the at least one support plate having a top surface, a bottom surface opposite to the top surface; and defining a through-hole defined by the at least one support plate extending from the top surface to the bottom surface; wherein the through-hole is configured to receive the at least one bearing in which the at least one support plate and the at least one bearing operably engage with one another.

22. A jib crane, comprising:

an open column having a first end and a second end opposite to the first end that is adapted to operably engage with a ground surface;

at least one interior space collectively defined by the open column between the first end and the second end;

a crane beam operably engaged with the open column at the first end of the open column; the crane beam comprises:

a first strut;

a second strut operably engaged with the first strut; and a channel collectively defined between the first strut and the second strut;

wherein the trolley assembly is operably engaged with the crane beam between the first strut and the second strut inside the channel;

a bearing assembly operably engaged with the crane beam and the open column, the bearing assembly having at least one bearing positioned inside of the at least one interior space defined by the open column; and a trolley assembly operably engaged with crane beam and the bearing assembly, the trolley assembly comprises:

a trolley frame operably engaged with the mounting plate of the bearing assembly; and at least one roller assembly operably engaged with the support plate and the crane beam;

wherein the at least one roller assembly is configured to enable longitudinal movement of the crane beam in aft and fore directions relative to the open column.

23. A jib crane, comprising:

an open column having a first end and a second end opposite to the first end that is adapted to operably engage with a ground surface;

at least one interior space collectively defined by the open column between the first end and the second end;

a crane beam operably engaged with the open column at the first end of the open column, the crane beam comprises:

a first end;

a second end opposite to the first end of the crane beam; and at least one rail extending between the first end of the crane beam and the second end of the crane beam;

wherein the at least one rail is configured to receive the at least one roller assembly in which the crane beam and the at least one roller assembly operably engage with one another;

at least one support plate operably engaging the open column at the first end of the open column;

a bearing assembly operably engaged with the crane beam and the open column, the bearing assembly having at least one bearing positioned inside of the at least one interior space defined by the open column; and a trolley assembly operably engaged with crane beam and the bearing assembly, the trolley assembly having:

a trolley frame operably engaged with the mounting plate of the bearing assembly; and at least one roller assembly operably engaged with the support plate and the crane beam;

wherein the at least one roller assembly is configured to enable longitudinal movement of the crane beam in the aft and fore directions relative to the open column.

* * * * *